United States Patent [19]

Osaka et al.

[11] Patent Number: 4,715,876

[45] Date of Patent: Dec. 29, 1987

[54] METHOD OF AND APPARATUS FOR COUPLING MULTICORE COATED OPTICAL FIBERS

[75] Inventors: Keiji Osaka; Yuichi Usui; Tooru Yanagi, all of Yokohama, Japan

[73] Assignee: Sumitomo Electric Industries, Ltd., Osaka, Japan

[21] Appl. No.: 878,777

[22] Filed: Jun. 26, 1986

[30] Foreign Application Priority Data

Jun. 28, 1985 [JP] Japan .............................. 60-142770

[51] Int. Cl.⁴ .................... C03B 37/16; C03B 37/023; G02B 6/38
[52] U.S. Cl. .......................................... 65/4.21; 65/2; 65/10.2; 65/42; 350/96.21
[58] Field of Search ...................... 65/4.21, 2, 10.2, 42; 350/96.21, 96.22

[56] References Cited

U.S. PATENT DOCUMENTS

4,415,347  11/1983  Malinge et al. ................... 65/4.21

FOREIGN PATENT DOCUMENTS

3338493  5/1985  Fed. Rep. of Germany ....... 65/42.1

OTHER PUBLICATIONS

"Optical Fiber Cutting Tool and Automatic Splicing Tool", Toda et al.; Sumitomo Electrical Technic Review, No. 19, Jan. 1980, pp. 85-91.
Electronics Leters, vol. 20, No. 25/26, Dec. 1984, pp. 1065-1066, Stevenage, Herts, GB; T. Haibara et al.: "Fully Automatic Optical Fibre Arc-Fusion Splice Machine".
Journal of Lightwave Technology, vol. LT-2, No. 1, Feb. 1984, pp. 25-31, IEEE, New York, U.S.: M. Tachikura et al., "Fusion Mass-Splices for Optical Fibers Using High-Frequency Discharge".
Journal of Lightwave Technology, vol. LT-2, No. 1, Feb. 1985, pp 83-92, IEEE, New York, U.S., A. K. Das et al.: "Low-Loss Fusion Splices of Optical Fibers".
Electronics and Communications in Japan, vol. 68, No. 1, part 1, Jan. 1985, pp. 63-72, Scripta Technica Inc., Silver Spring, Md., U.S.; S. Nagasawa et al.: "Reliability of V-Groove Optical Fiber Mass Splice. Improvement of Splice Loss Temperature Characteristics".
Patents Abstracts of Japan, vol. 8, No. 82, (P-268) [1519], 14th Apr. 1984; & JP-A-59 118.
FR-A-2 500 173, (Compagnie Lyonnaise De Transmissions Optiques).

*Primary Examiner*—Robert L. Lindsay
*Attorney, Agent, or Firm*—Cushman, Darby & Cushman

[57] ABSTRACT

A method of and an apparatus for coupling ends of first and second multicore coated optical fibers each having multiple optical fibers integrally covered with a coating. The method includes a clamping step of setting the first and second multicore coated optical fibers in first and second clamp members, respectively, a cutting step of cutting off exposed fiber ends of the first and second multicore coated optical fibers and a coupling step of coupling cut end faces of the optical fibers of the first and second multicore coated optical fibers such that the cutting step and the coupling step are performed without detaching the first and second multicore coated optical fibers from the first and second clamp members, respectively.

12 Claims, 34 Drawing Figures

METHOD OF AND APPARATUS FOR COUPLING MULTICORE COATED OPTICAL FIBERS

BACKGROUND OF THE INVENTION

The present invention generally relates to optical fibers and more particularly, to a method of and an apparatus for coupling ends of multicore coated optical fibers each having multiple optical fibers.

Conventional methods of coupling ends of multicore coated optical fibers generally comprise a step (1) of removing a reinforcement coating layer from an end portion of each of the coated optical fibers into exposed fiber ends (glass portions) and cleaning surfaces of the exposed fiber ends, a step (2) of cutting off the exposed fiber ends to mirror surfaces, a step (3) of coupling the exposed fiber ends of the coated optical fibers through fusion bonding, etc. and a step (4) of forming a reinforcement at a joint portion of the exposed fiber ends of the multicore coated optical fibers.

In the above described known steps (1) to (4), coupling characteristics of an optical transmission path are greatly affected especially by steps (2) and (3). For example, such an undesirable phenomenon takes place that gaps between the end faces of the exposed fiber ends of the multiple optical fibers of one multicore coated optical fiber and opposite end faces of those of the other multicore coated optical fiber are scattered due to increase in amount of non-uniformity in axial positions of the end faces of the exposed fiber ends of each of the multicore coated optical fibers, thereby resulting in increase of the average coupling loss. Furthermore, in an extreme case, some of the exposed fiber ends of the multicore coated optical fibers cannot be coupled to each other. Meanwhile, in the case where one of the optical fibers is forcibly pushed to a predetermined position after its coupling with a mating optical fiber, the coupled optical fiber is sidewise deflected and therefore, is subjected to buckling so as to be brought into contact with a neighboring optical fiber, thus possibly resulting in fracture of the coupled optical fiber.

These drawbacks of the known methods mainly result from such a fact that since cutting and coupling operations of the optical fibers are performed in separate processes by using separate apparatuses, respectively, influences exerted on the optical fibers vary according to operations of the operator.

Two causes can be recited for non-uniformity in axial positions of the end faces of the exposed fiber ends during coupling of the multicore coated optical fibers. Namely, one cause is inaccuracy in cutting of the exposed fiber ends and the other cause is projection or retraction of the exposed fiber ends due to handling of the coated optical fibers, which handling is performed until a point immediately prior to coupling of the exposed fiber ends after the exposed fiber ends of the coated optical fibers have been cut off. The first cause is further classified into (A) difference in lengths of initial flaws formed on the exposed fiber ends and (B) difference in circumferential positions of the initial flaws and directions of planes for bending the exposed fiber ends. In order to cut off the exposed fiber ends, a so-called stress fracture method is usually employed in which the initial flaws are formed on the exposed fiber ends by using a blade made of hard materials such as cemented carbide, etc. and then, a bending stress or a tensile stress is applied to the exposed fiber ends so as to cause progress of fracture at the initial flaws such that fractured end faces having mirror surfaces are obtained. Accordingly, when the initial flaws are made smaller and sharper, positions of fracture of the exposed fiber ends become more uniform. On the contrary, when the initial flaws A are long as shown in FIG. 1, positions of fracture of exposed fiber ends 3 of the multicore coated optical fiber 2 are likely to be scattered due to scatter of position of the initial flaws A into an axial length B.

Meanwhile, as shown in FIG. 2, it is desirable that the initial flaw A and the bending direction f of the exposed fiber end 3 are disposed in an identical plane as closely as possible such that the fractured end face 10 of the exposed fiber end 3 is perpendicular to the axis of the exposed fiber end 3. On the other hand, as shown in FIG. 3, when the initial flaw A forms an angle with the bending direction f, such possibilities become larger that the fractured end face 10 is inclined at an angle 0 to a plane perpendicular to the axis of the exposed fiber end 3 or the fractured end face 10 becomes uneven. Furthermore, when the depth of the initial flaw A is too small, the fractured end face 10 is not finished to a mirror surface and thus, has a rough surface. In order to stably obtain the fractured end face 10 having a mirror surface, the initial flaw A of at least 2 to 3 $\mu m$ in depth is required to be formed on the exposed fiber end 3. Therefore, it is preferable that the initial flaw A is made as small as possible. In addition, it is most desirable that the exposed fiber end 3 is bent in a plane containing the initial flaw A and the axis of the exposed fiber end 3. However, in the case where the initial flaw A is manually formed on the exposed fiber end 3 or the exposed fiber end 3 is fractured by employing conventional cutting methods, an amount C of non-uniformity in axial positions of the fractured end faces 10 reaches at least 50 $\mu m$ as shown in FIG. 4.

Non-uniformity in axial positions of the fractured end faces 10 owing to the earlier said second cause, i.e., handling of the coated optical fiber 2 after cutting of the exposed fiber ends 3, is likely to increase, in amount, especially in a loosely coated multicore optical fiber in which mobility of the optical fibers relative to the coating is high. This phenomenon is divided into two cases. In one case (FIG. 5), a tapelike multicore coated optical fiber 2 is bent widthwise, so that the end faces 10 are sequentially retracted from each other in an oblique direction, thereby resulting in production of the amount C of non-uniformity in axial positions of the end faces 10. In the other case (FIG. 6), only one 8 of the optical fibers is curved in the tapelike multicore coated optical fiber 2, so that the exposed fiber end 3 of the optical fiber 8 is projected by the distance C or retracted from those of the remaining optical fibers by axially stretching out the optical fiber 8. The amount C of non-uniformity in axial positions of the fractured end faces 10 in these two cases of FIGS. 5 and 6 sometimes reaches as large a value as 100 $\mu m$.

SUMMARY OF THE INVENTION

Accordingly, an essential object of the present invention is to provide a method of and an apparatus for coupling ends of multicore coated optical fibers each having multiple optical fibers, by which an excellent joint having a minimum coupling loss can be obtained, with substantial elimination of the disadvantages inherent in conventional methods and apparatuses of this kind.

In order to accomplish this object of the present invention, a method of coupling a first end of a first multicore coated optical fiber and a second end of a second multicore coated optical fiber, with the first and second multicore coated optical fibers each having multiple optical fibers integrally covered with a reinforcement coating, according to the present invention comprises: a clamping step of setting in first and second clamp members, the first multicore coated optical fiber having first exposed fiber ends and the second multicore coated optical fiber having second exposed fiber ends, respectively; the first exposed fiber ends being obtained by removing the reinforcement coating from the first end of the first multicore coated optical fiber; the second exposed fiber ends being obtained by removing the reinforcement coating from the second end of the second multicore coated optical fiber; a cutting step of cutting off the first and second exposed fiber ends such that the optical fibers of the first multicore coated optical fiber and the optical fibers of the second multicore coated optical fiber have first cut end faces at the first exposed fiber ends and second cut end faces at the second exposed fiber ends, respectively; and a coupling step of coupling the first and second cut end faces; the cutting step and the coupling step being performed without detaching the first and second multicore coated optical fibers from the first and second clamp members, respectively.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

As a result of comprehensive study on problems of cutting and coupling of optical fibers, the present inventors have found that factors vitally affecting coupling characteristics of the optical fibers include an end-face angle formed between an end face of each optical fiber and a plane perpendicular to an axis of each optical fiber and evenness of the end face of each optical fiber. More specifically, in the case of single-mode optical fibers having a core diameter of not more than 10 $\mu$m, an end-face angle of less than $\pm 1°$ does not affect the coupling loss seriously but an end-face angle exceeding $\pm 1°$ or more affects the coupling loss. Meanwhile, regarding evenness of the end face of each optical fiber, when its cladding portion has an unevenness exceeding 10 $\mu$m, the coupling loss increases even if at least its core portion is flat. However, these causes can be substantially eliminated by setting an initial flaw of each optical fiber and a bending direction of each optical fiber in an identical plane as referred to earlier.

Furthermore, when optical fibers are coupled with each other in a twisted state, a torsional stress is applied, in a concentrated manner, to a portion having a low strength, thus possibly resulting in increase of the coupling loss, variations of the coupling loss due to temperature change and fracture of the coupling portion. Therefore, it is desirable that the optical fibers be coupled and reinforced in a state as free from stress as possible. To this end, the present inventors have found that the optical fibers should be transported, in a cantilever state immediately after cutting of the optical fibers, i.e., in a state free from stress, to the next coupling process. Namely, such operations should be avoided that the optical fibers are newly clamped during transport of the optical fibers after cutting thereof and that the optical fibers are coupled with each other in a twisted state. In addition, it is preferable that after the optical fibers have been coupled with each other, the optical fibers be reinforced in a relative positional relationship assumed at the time of cutting of the optical fibers.

Figure 1:
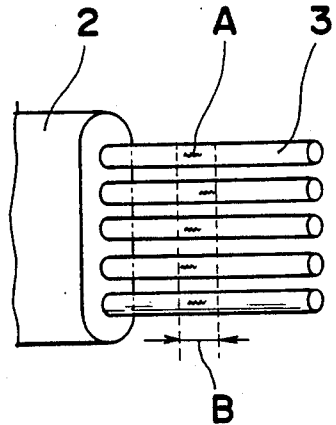
FIGS. 1 to 6 are views explanatory of drawbacks of prior art methods of coupling multicore coated optical fibers.
Figure 4:
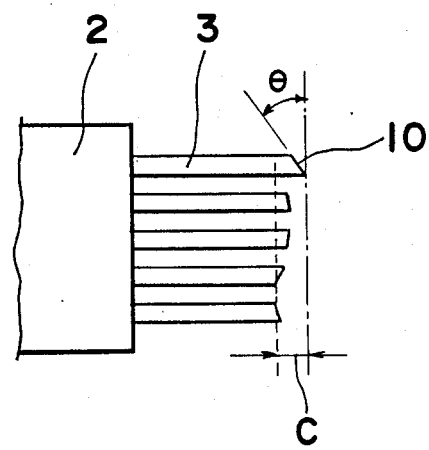
Figure 2:
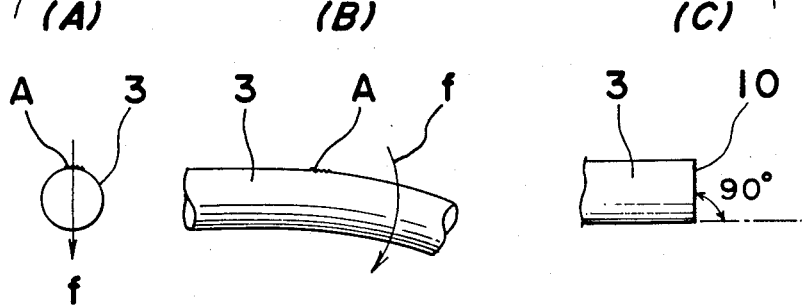
Figure 3:
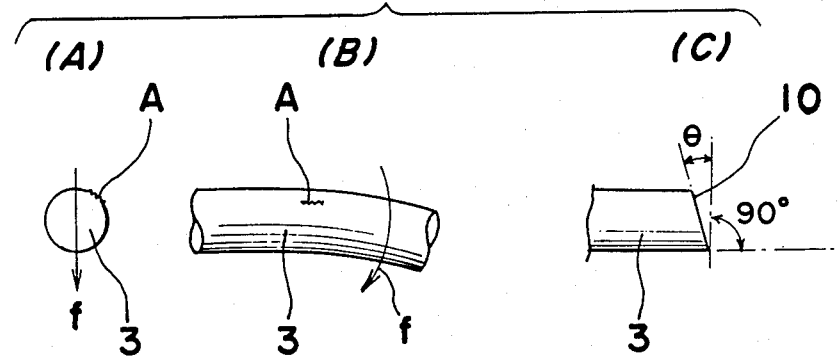
Figure 5:
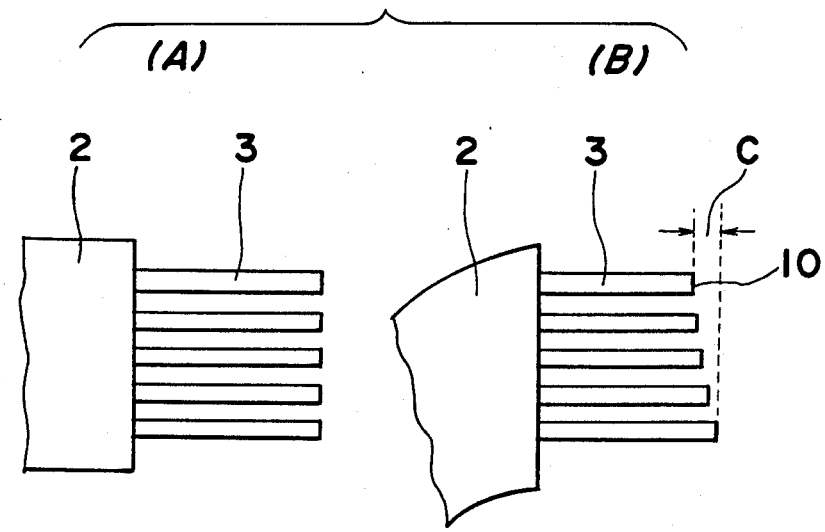
Figure 6:
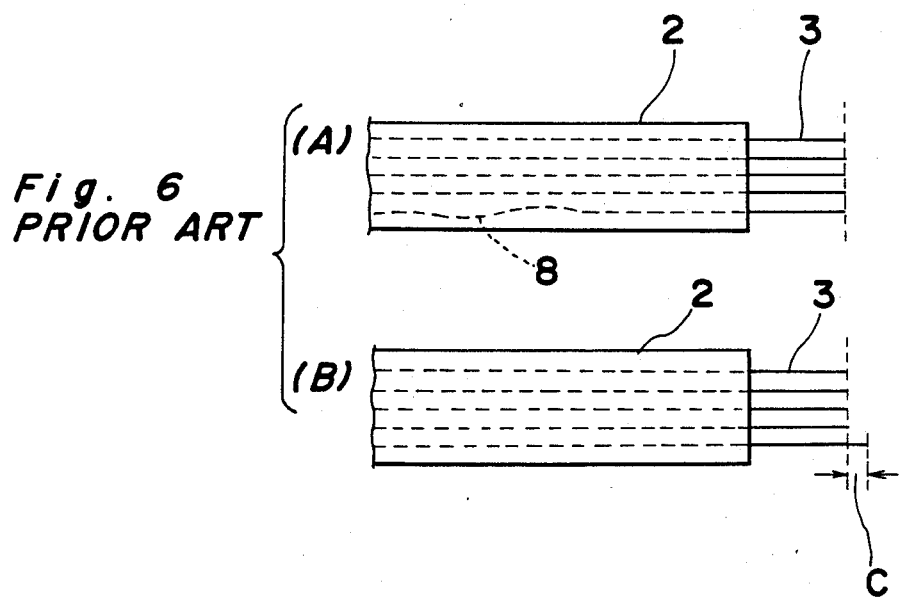
Figure 7A:
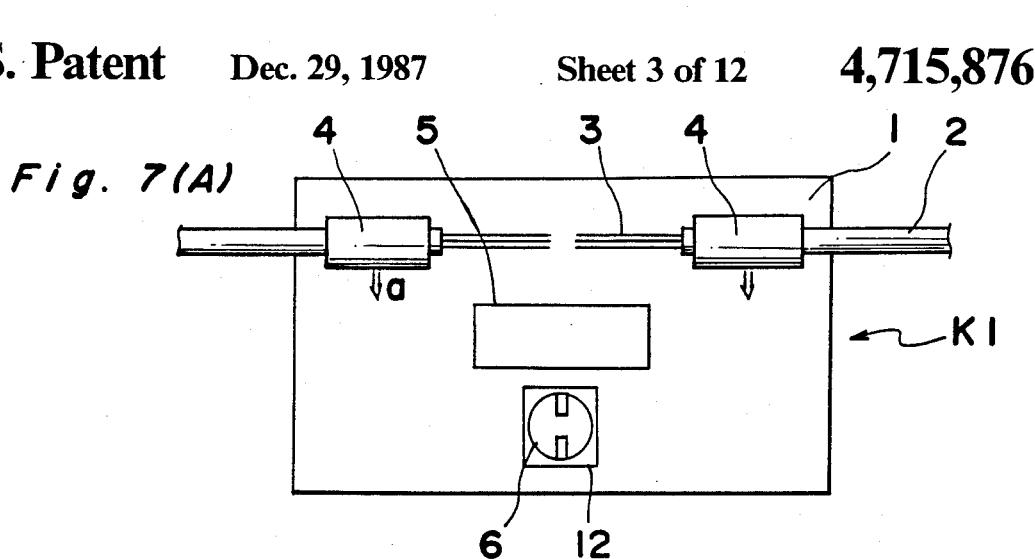
FIGS. 7(A) to 7(C) are schematic top plan views of an apparatus for coupling multicore coated optical fibers, according to a first embodiment of the present invention, particularly showing its operational steps.
Figure 7B:
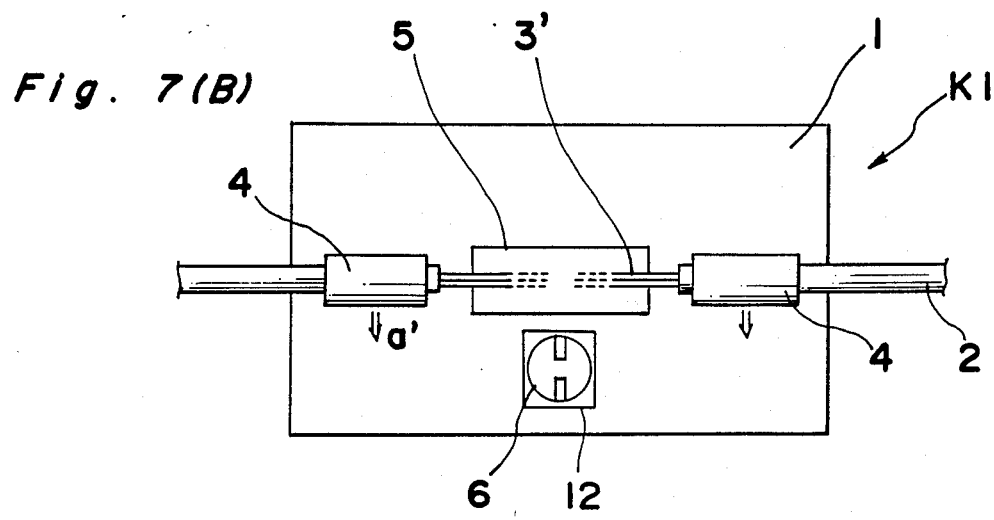
Figure 7C:
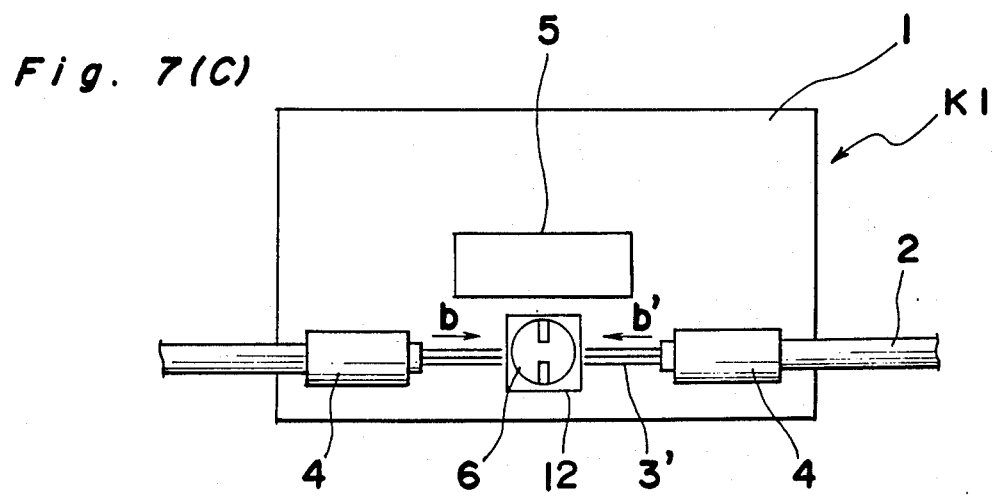

Referring now to the drawings, there is shown in FIGS. 7(A) to 7(C), an apparatus K1 for coupling multicore coated optical fibers 2 each having multiple optical fibers, according to a first embodiment of the present invention. Each of the multicore coated optical fibers 2 has exposed fiber ends (glass portions) 3 obtained by removing a coating from an end portion of each of the multicore coated optical fibers 2. The apparatus K1 includes a table 1, a pair of movable clamp members 4 for clamping the multicore coated optical fibers 2, respectively, a cutting mechanism 5 for cutting the multicore coated optical fibers 2 and a coupling mechanism 6 for coupling the multicore coated optical fibers 2. The movable clamp members 4 each having the multicore coated optical fiber 2 set therein are movably provided on the table 1, while the cutting mechanism 5 and the coupling mechanism 6 are securely mounted on the table 1. The coupling mechanism 6 employs, as its heat source, high-frequency heating through aerial discharge. In the apparatus K1, the movable clamp members 4 have a degree of freedom of movement of 2 so as to be moved in the sidewise direction and in the axial direction of the multicore coated optical fiber 2.

The apparatus K1 is operated as follows. Initially, the multicore coated optical fiber 2 having the exposed fiber ends 3 is set in each of the movable clamp members 4 by disposing the movable clamp members 4 at such a position on the table 1 as shown in FIG. 7(A). Then, the movable clamp members 4 having the multicore coated optical fibers 2 set therein, respectively are displaced on the table 1 in the direction of the arrow a of FIG. 7(A) up to such a position on the table 1 as shown in FIG. 7(B). When the movable clamp members 4 are disposed at the position of FIG. 7(B) on the table 1, the cutting mechanism 5 is manually or electrically operated so as to cut off the exposed fiber ends 3 of each of the multicore coated optical fibers 2 to mirror surfaces such that the remaining exposed fiber ends 3' of each of the multicore coated optical fibers 2 have end faces cut to the mirror surfaces. Subsequently, the movable clamp members 4 having the multicore coated optical fibers 2 set therein, respectively are further displaced on the table 1 in the direction of the arrow a' of FIG. 7(B) up to such a position on the table 1 as shown in FIG. 7(C). Thereafter, the movable clamp members 4 are displaced towards each other on the table 1 in directions b and b' so as to butt the end faces of the remaining exposed fiber ends 3' of one multicore coated optical fiber 2 and those of the other multicore coated optical fiber 2 against each other such that the remaining exposed fiber ends 3' of one multicore coated optical fiber 2 and those of the other multicore coated optical fiber 2 are coupled with each other by the coupling mechanism 6 through electric discharge and pushing of the opposite multicore coated optical fibers 2 to each other. Finally, by releasing the movable clamp members 4 from the clamping of the multicore coated optical fibers 2, the coupled multicore coated optical fiber 2 is taken out of the movable clamp members 4.

Figure 8A:
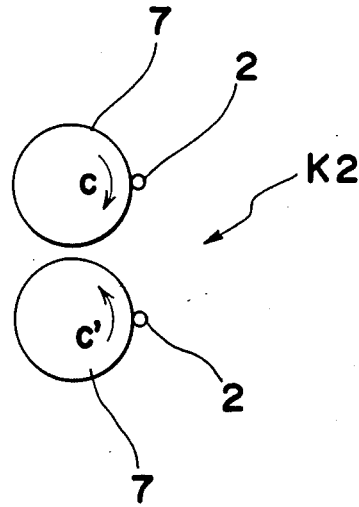
FIGS. 8(A) and 8(B) are a schematic side elevational view and a schematic front elevational view of an apparatus in one operational step, according to a second embodiment of the present invention.
Figure 8B:
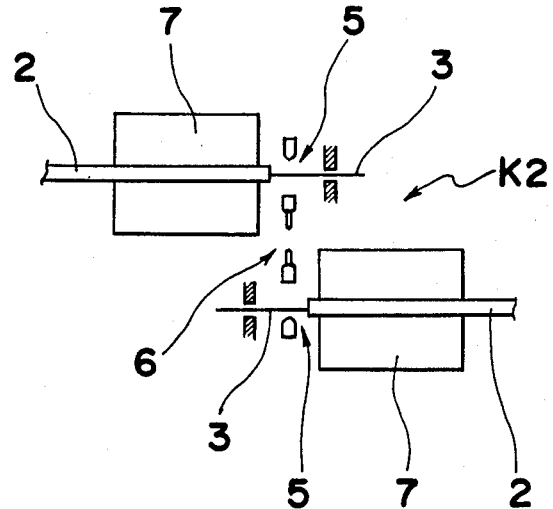
Figure 9A:
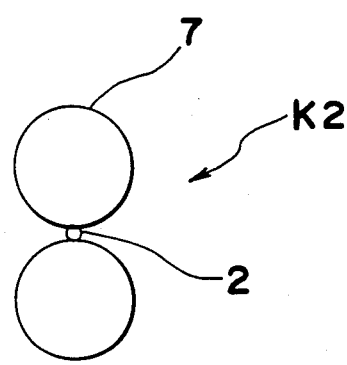
FIGS. 9(A) and 9(B) are views similar to FIGS. 8(A) and 8(B), respectively, particularly showing the apparatus of FIG. 8 in another operational step.
Figure 9B:
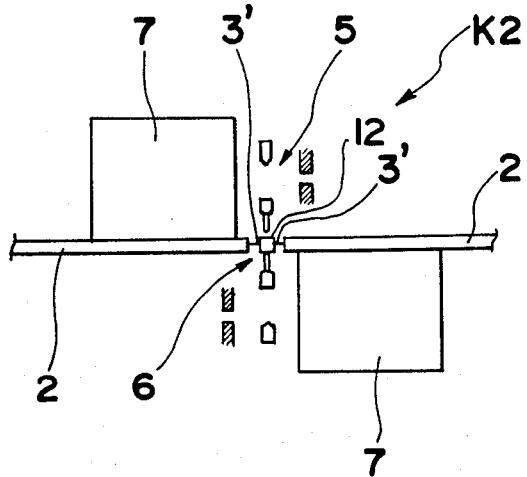

Referring to FIGS. 8 and 9, there is shown an apparatus K2 for coupling the multicore coated optical fibers 2, according to a second embodiment of the present invention. In the apparatus K2, the multicore coated optical fibers 2 are, respectively, secured to side faces of opposed rotating cylinders 7 as shown in FIGS. 8(A) and 8(B) such that the exposed fiber ends 3 of each of the multicore coated optical fibers 2 are cut off to mirror surfaces by the cutting mechanism 5 such that the remaining exposed fiber ends 3' of each of the multicore coated optical fibers 2 have end faces cut to the mirror surfaces. Then, by rotating the cylinders 7 in the directions of the arrows c and c' of FIG. 8(A), the multicore coated optical fibers 2 make circular motions so as to be transported to such a position as shown in FIGS. 9(A) and 9(B). When the multicore coated optical fibers 2 are disposed at the position of FIGS. 9(A) and 9(B), the end faces of the remaining exposed fiber ends 3' of one multicore coated optical fiber 2 and those of the other multicore coated optical fiber 2 are butted against each other so as to be coupled with each other by the coupling mechanism 6. Subsequently, the coupled multicore coated optical fiber 2 is removed from the cylinders 7. In the apparatus K2, the movable clamp members 4 have a degree of freedom of movement of 2 so as to be moved in the rotational direction and in the axial direction of the multicore coated optical fiber 2.

Figure 10A:
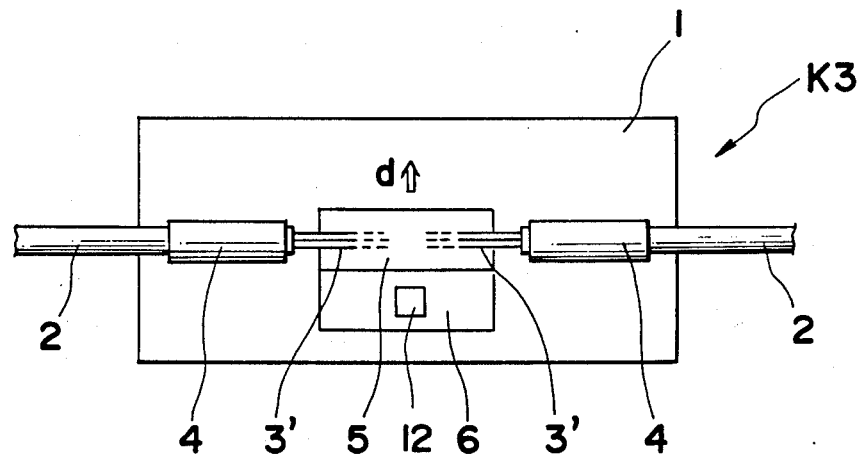
FIGS. 10(A) and 10(B) are schematic top plan views of an apparatus according to a third embodiment of the present invention, particularly showing its operational steps.
Figure 10B:
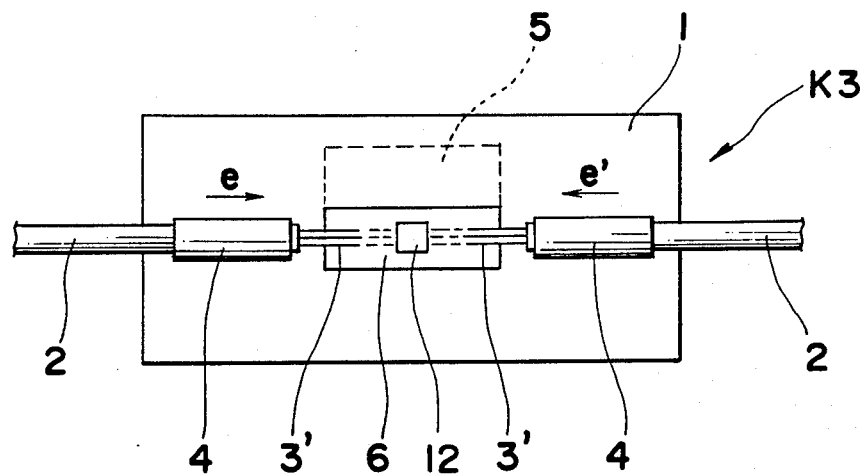

Referring further to FIGS. 10(A) and 10(B), there is shown an apparatus K3 for coupling the multicore coated optical fibers 2, according to a third embodiment of the present invention. In the apparatus K3, not only the movable clamp members 4 but the cutting mechanism 5 and the coupling mechanism 6 are movably provided on the table 1 such that the cutting mechanism 5 and the coupling mechanism 6 are displaced on the table 1 in a direction perpendicular to the axis of the multicore coated optical fibers 2. Thus, after the multicore coated optical fibers 2 have been, respectively, set in the movable clamp members 4 disposed at the position of FIG. 10(A), the exposed fiber ends 3 of each of the multicore coated optical fibers 2 are cut off to mirror surfaces by the cutting mechanism 5 such that the remaining exposed fiber ends 3' of each of the multicore coated optical fibers 2 have end faces cut to the mirror surfaces. Subsequently, the cutting mechanism 5 is displaced in the direction of the arrow d of FIG. 10(A) and then, the coupling mechanism 6 is displaced also in the direction of the arrow d of FIG. 10(A) so as to be disposed between the movable clamp members 4 as shown in FIG. 10(B). When the coupling mechanism 6 is disposed at the position of FIG. 10(B), the movable clamp members 4 are displaced towards each other in the directions of the arrows e and e' of FIG. 10(B), so that the end faces of the remaining exposed fiber ends 3' of one multicore coated optical fiber 2 and those of the other multicore coated optical fiber 2 are butted against each other so as to be coupled with each other by the coupling mechanism 6. Thereafter, the coupled multicore coated optical fiber 2 is removed from the table 1. In the apparatus K3, the movable clamp members, 4 have a degree of freedom of movement of 1 so as to be moved only in the axial direction of the multicore coated optical fiber 2. In the apparatus K3, since the cutting mechanism 5 and the coupling mechanism 6 are displaced on the table 1, the apparatus K3 becomes large in size. However, in the apparatus K3, since the displacement of the multicore coated optical fibers 2 to be handled with much care can be restricted to a minimum, it becomes possible to cut and couple the multicore coated optical fibers 2 at good performance. It should be further noted that a coupling guide 12 (FIG. 11) to be described later is movably mounted on the coupling mechanism 6 in the apparatuses K1 to K3 so as to be moved in the upward and downward directions in FIG. 11(A).

Meanwhile, in the present invention, not only fusion bonding through electric discharge but also other heat sources such as laser, gas, etc. can be employed for coupling the multicore coated optical fibers. Furthermore, in addition to fusion bonding, a method of forming a reinforcement directly, for example, resinous bonding can be employed for coupling the multicore coated optical fibers in the present invention. Moreover, in the present invention, a step of removing the coating from the end portion of each multicore coated optical fiber and a step of forming the reinforcement at the joint portion of the coupled multicore coated optical fiber can be added to the cutting and coupling steps.

In accordance with the present invention, amount of non-uniformity in axial positions of the fractured end faces of the exposed fiber ends and scatters of angles formed between the fractured end faces of the exposed fiber ends and a plane perpendicular to the axis of each optical fiber can be minimized and an average coupling loss can be reduced.

Furthermore, in accordance with the present invention, since coupling lengths of the respective optical fibers can be made uniform, the coupled multicore coated optical fiber has a large average fracture strength. Accordingly, in the present invention, the multicore coated optical fibers can be coupled with each other excellently and at high yield.

Figure 11A:
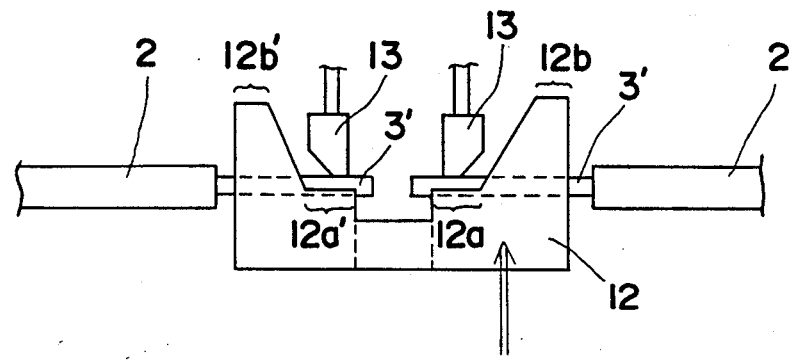
FIGS. 11(A) and 11(B) are a front elevational view and a perspective view of a coupling stage employed in the apparatus of the present invention, respectively.
Figure 11B:
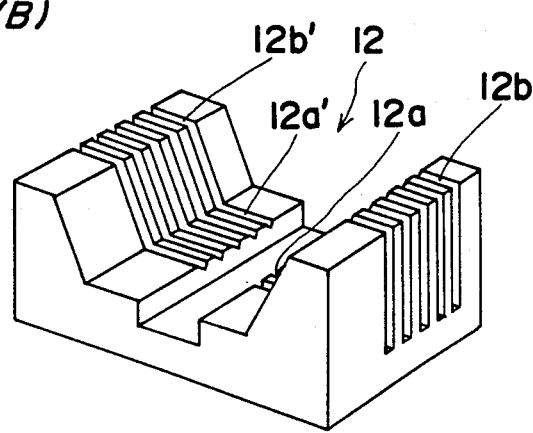
Figure 11C:
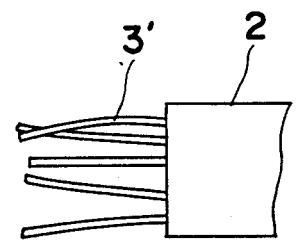
FIG. 11(C) is a top plan view of a multicore coated optical fiber usable in the coupling stage of FIGS. 11(A) and 11(B)

Referring to FIGS. 11(A) and 11(B), there is shown the coupling guide 12 for guiding the optical fibers of the multicore coated optical fibers 2 after the exposed fiber ends 3 of the multicore coated optical fiber 2 have been cut off by the cutting mechanism 5. The coupling guide 12 is formed with first V-shaped grooves 12a and first comb-shaped recesses 12b for receiving the remaining exposed fiber ends 3' of one multicore coated optical fiber 2 and with second V-shaped grooves 12a' and second comb-shaped recesses 12b' for receiving the remaining exposed fiber ends 3' of the other multicore coated optical fiber 2. Since the first and second V-shaped grooves 12a and 12a' and the first and second comb-shaped recesses 12b and 12b' are formed in conformity with a predetermined pitch of the optical fibers of the multicore coated optical fibers 2, it becomes possible to set the remaining exposed fiber ends 3' in the coupling guide 12 accurately with much ease by moving the coupling guide 12 in the direction perpendicular to the fiber axis. Initially, base portions of the remaining exposed fiber ends 3' are dropped into the comb-shaped recesses 12b and 12b' such that distal end portions of the remaining exposed fiber ends 3' are gradually straightened into the V-shaped grooves 12a and 12a'. Then, the distal end portions of the remaining exposed fiber ends 3' of each of the multicore coated optical fibers 2 are held by a retainer 13. Accordingly, even the remaining exposed fiber ends 3' of each of the multicore coated optical fibers 2, which do not extend straight so as to interfere with each other as shown in FIG. 11(C), can be set in the coupling guide 12 properly so as to be coupled with the mating exposed fiber ends 3'. This inserting motion can be attained either by moving the guide 12 relative to the fiber 2 or by moving the fiber 2 relative to the guide 12.

Figure 12A:
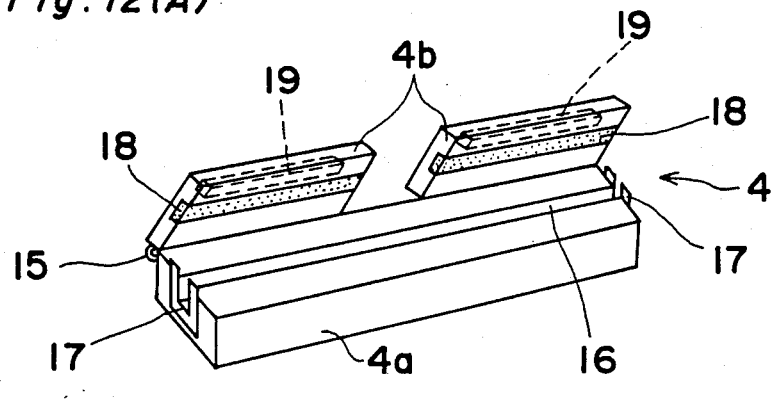
FIGS. 12(A) and 12(B) are a perspective view and a side elevational view of one example of a clamp member employed in the apparatus of the present invention, respectively.
Figure 12B:
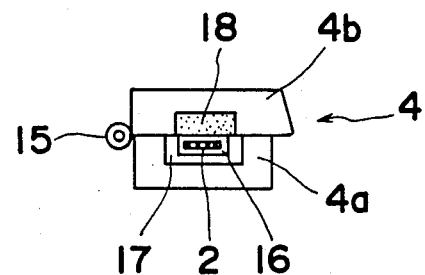
Figure 12C:
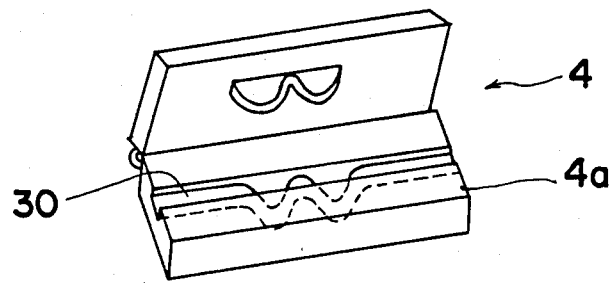
FIG. 12(C) is a perspective view of another example of the clamp member of FIGS. 12(A) and 12(B)

Meanwhile, FIGS. 12(A) and 12(B) show one example of the clamp member 4. The clamp member 4 includes a base portion 4a and a pair of lids 4b mounted on the base portion 4a through a hinge 15. The base portion 4a is formed with a guide groove 16 for receiving each of the multicore coated optical fibers 2. A pair of guide plates 17 are, respectively, attached to opposite end faces of the base portion 4a. A rubber pad 18 is securely fitted into a recess of each of the lids 4b so as to confront the guide groove 16 when the lids 4b and the base portion 4a are in engagement with each other. A magnet 19 is embedded in each of the lids 4b so as to urge each of the lids 4b towards the base portion 4a such that the multicore coated optical fiber 2 set in the guide groove 16 is clamped, through the urging force of the magnet 19, by the rubber pad 18. The magnet 19 produces a clamping force of the clamp member 4 in this example but can be replaced by a cam, etc. It can also be so arranged that the lids 4b are made of iron and the magnet 19 is provided in the base portion 4a. It can also be further so arranged that in order to facilitate the removal of the multicore coated optical fiber 2 from the base portion 4a, the base portion 4a is formed with an arcuately winding groove 30 as shown in FIG. 12(C). Furthermore, opening and closing operations of the clamp member 4 are performed manually in this example but can also be performed electrically by using a motor, a solenoid, etc. Namely, any other clamp which positively clamps the multicore coated optical fibers 2 during the cutting step and the coupling step can be employed as the clamp member 4.

Figure 13:
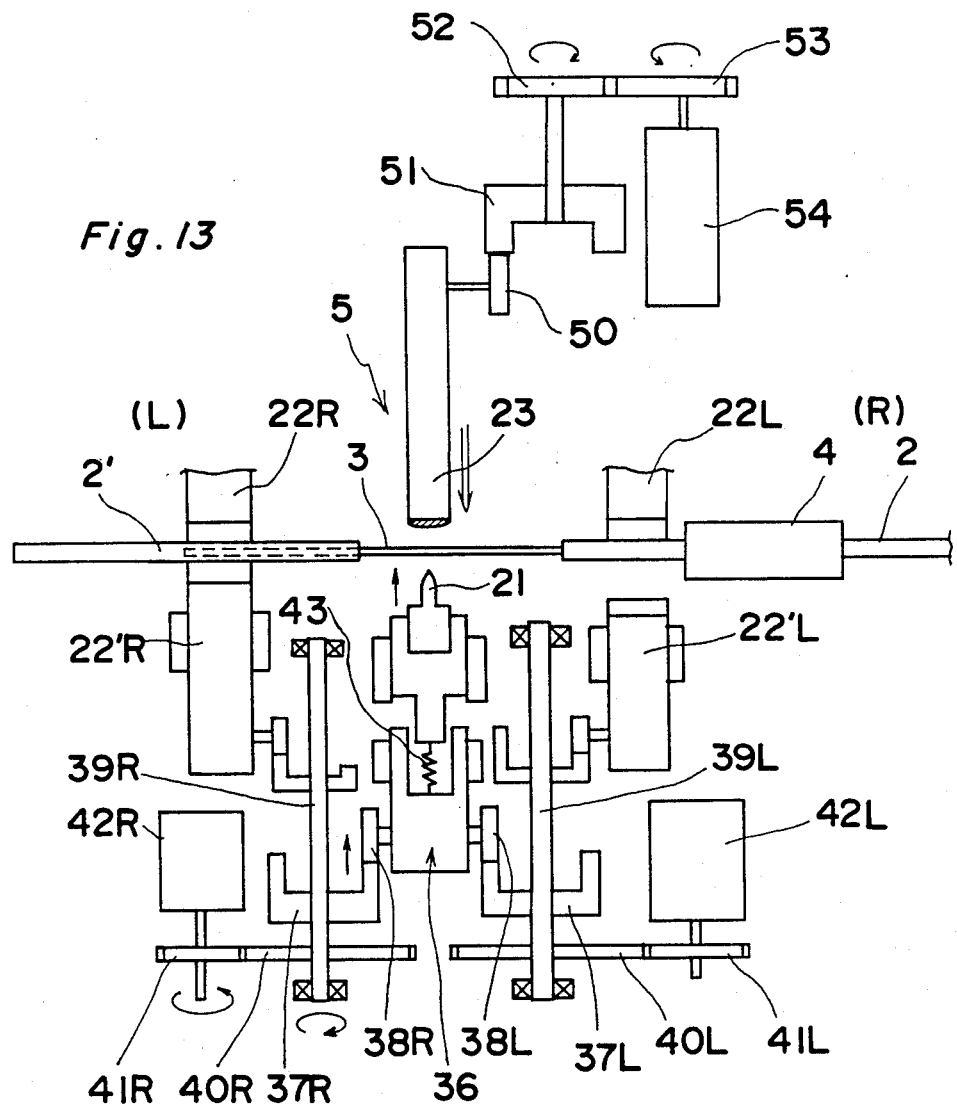
FIG. 13 is a front elevational view of one example of a cutting mechanism employed in the apparatus of the present invention.

Referring to FIG. 13, there is shown one example of the cutting mechanism 5. This figure shows the way to cut the right-hand fiber. The cutting mechanism 5 includes a blade 21, a stem 23, a cam follower 50 mounted on the stem 23, a cam 51 engageable with the cam follower 50, gears 52 and 53, a motor 54 for driving the stem 23 and two pairs of clamps 22R and 22L and 22'R and 22'L for gripping therebetween distal end portions 2' of the right-hand and left-hand multicore coated optical fibers 2, respectively. The clamps 22R and 22L are fixedly provided, while the clamps 22'R and 22'L are movably provided so as to be moved away from and towards the clamps 22R and 22L, respectively. The exposed fiber ends 3 are disposed axially inwardly of the distal end portion 2' of the multicore coated optical fiber 2. A distal end of the stem 23 has a curvature and confronts the blade 21. In FIG. 13, the right-hand multicore coated optical fiber 2 is clamped by the clamp member 4 such that the blade 21 and the stem 23 confront each other through the exposed fiber ends 3, while the distal end portion 2' of the multicore coated optical fiber 2 is gripped between the clamps 22R and 22'R. Initially, the stem 23 is displaced towards the exposed fiber ends 3 so as to be brought into contact with the exposed fiber ends 3 such that the exposed fiber ends 3 are supported by the stem 23. Then, the blade 21 is applied to the exposed fiber ends 3 so as to inflict initial flaws on the exposed fiber ends 3. Thereafter, the blade 21 is released away from the exposed fiber ends 3. Subsequently, the stem 23 is thrusted into the exposed fiber ends 3 so as to fracture the exposed fiber ends 3. Then, the exposed fiber ends 3 of the left-hand multicore coated optical fiber 2 are fractured in the same steps as described above.

More specifically, the cutting mechanism 5 further includes a blade unit 36 having the blade 21 mounted thereon and a pair of cams 37R and 37L for actuating the blade unit 36 when the exposed fiber ends 3 of the right-hand and left-hand multicore coated optical fibers 2 are fractured by the blade 21, respectively. In order to adjust a pressure exerted on the exposed fiber ends 3 by the blade 21, the blade 21 is mounted on the blade unit 36 through a spring 43. Furthermore, the cutting mechanism 5 includes a pair of cam followers 38R and 38L engageable with the cams 37R and 37L, respectively, a pair of gears 40R and 40L, a pair of gears 41R and 41L engageable with the gears 40R and 40L, respectively and a pair of DC motors 42R and 42L mounted with the gears 41R and 41L, respectively. The cam followers 38R and 38L are mounted on the blade unit 36, while each of the cams 37R and 37L and each of the gears 40R and 40L are mounted on a shaft 39.

By the above described arrangement of the cutting mechanism 5, when one of the DC motors 42R and 42L is driven, the corresponding one of the cams 37R and 37L is brought into engagement with the corresponding one of the cam followers 38R and 38L through mesh between the corresponding ones of the gears 40R and 41R and the gears 40L and 41L so as to actuate the blade unit 36 such that the blade 21 is applied to the corresponding exposed fiber ends 3. Thus 2 fiber ends are alternately cut by the same mechanism.

Figure 14:
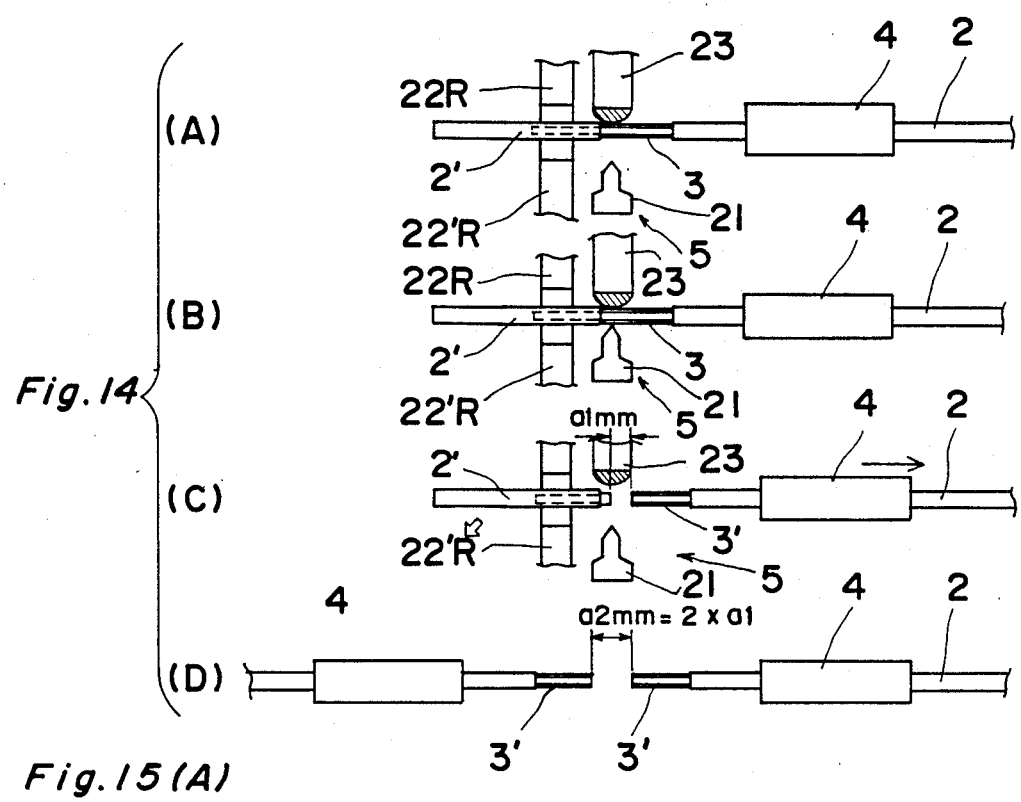
FIGS. 14(A) to 14(D) are views explanatory of sequential operations of the cutting mechanism of FIG. 13.

Meanwhile, in the above described cutting mechanism 5, in order to fracture the exposed fiber ends 3 of the multicore coated optical fiber 2, the stem 23 is thrusted into the exposed fiber ends 3 after the initial flaws have been inflicted on the exposed fiber ends 3 by the blade 21. However, it can also be so arranged in the cutting mechanism 5 that the stem 23 is fixedly provided. In this case, the cutting mechanism 5 is operated as shown in FIGS. 14(A) to 14(D). Namely, initially, the distal end portion 2' of the rightward multicore coated optical fiber 2 clamped by the clamp member 4 is manually gripped between the clamps 22 and 22' such that the fixed stem 23 having the curvature is disposed between the clamps 22R and 22'R and the clamp member 4 as shown in FIG. 14(A). Then, the initial flaws are inflicted on the exposed fiber ends 3 by the blade 21 as shown in FIG. 14(B). Subsequently, the multicore coated optical fiber 2 is pulled through a distance of a1 mm in the direction of the arrow of FIG. 14(C) and thus, the exposed fiber ends 3 are fractured. Subsequently, the exposed fiber ends 3 of the leftward multicore coated optical fiber 2 are fractured in the same steps as shown in FIGS. 14(A) to 14(C). Thus, the remaining exposed fiber ends 3' of the righward multicore coated optical fiber 2 and those of the leftward multicore coated optical fiber 2 confront each other over a gap of a2 mm (=2×a1 mm) as shown in FIG. 14(D).

Figure 15A:
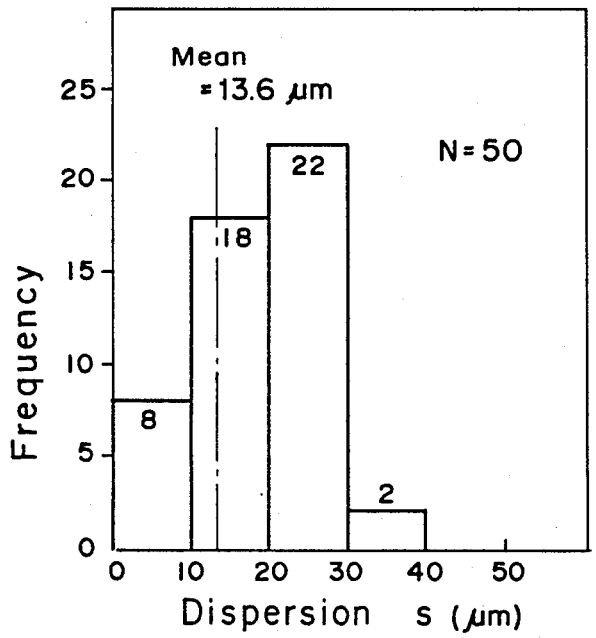
FIG. 15(A) is a graph indicative of cutting characteristics of the apparatus of the present invention.
Figure 15B:
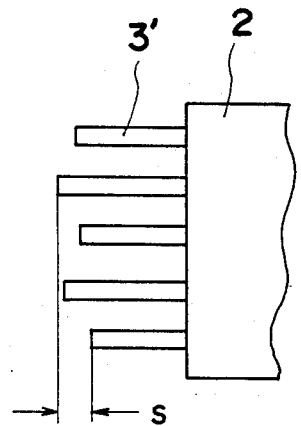
FIG. 15(B) is a view explanatory of cut exposed fiber ends of the multicore coated optical fiber.

Hereinbelow, cutting and coupling characteristics of the apparatus of the present invention will be described with reference to FIGS. 15 to 17 in the case where a tapelike multicore coated optical fiber having five graded index (GI) type optical fibers is employed as the multicore coated optical fiber 2. Each of the optical fibers has a core diameter of 50 μm and an outside diameter of 125 μm and the optical fibers are arranged at a pitch of 0.3 mm such that the tapelike multicore coated optical fiber has a width of 1.65 mm and a thickness of 0.43 mm. FIGS. 15 and 16 show the cutting characteristics of the apparatus of the present invention. The abscissa of FIG. 15(A) denotes a dispersion s of FIG. 15(B), i.e., a maximum amount of non-uniformity in axial positions of the end faces of the remaining exposed fiber ends 3' measured for each of 50 multicore coated optical fibers 2. A mean dispersion is about 14 μm and a maximum dispersion is 40 μm.

Figure 16B:
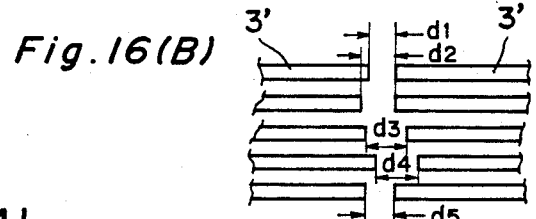
FIG. 16(B) is a view explanatory of gaps between the cut exposed fiber ends of the two multicore coated optical fibers.
Figure 16A:
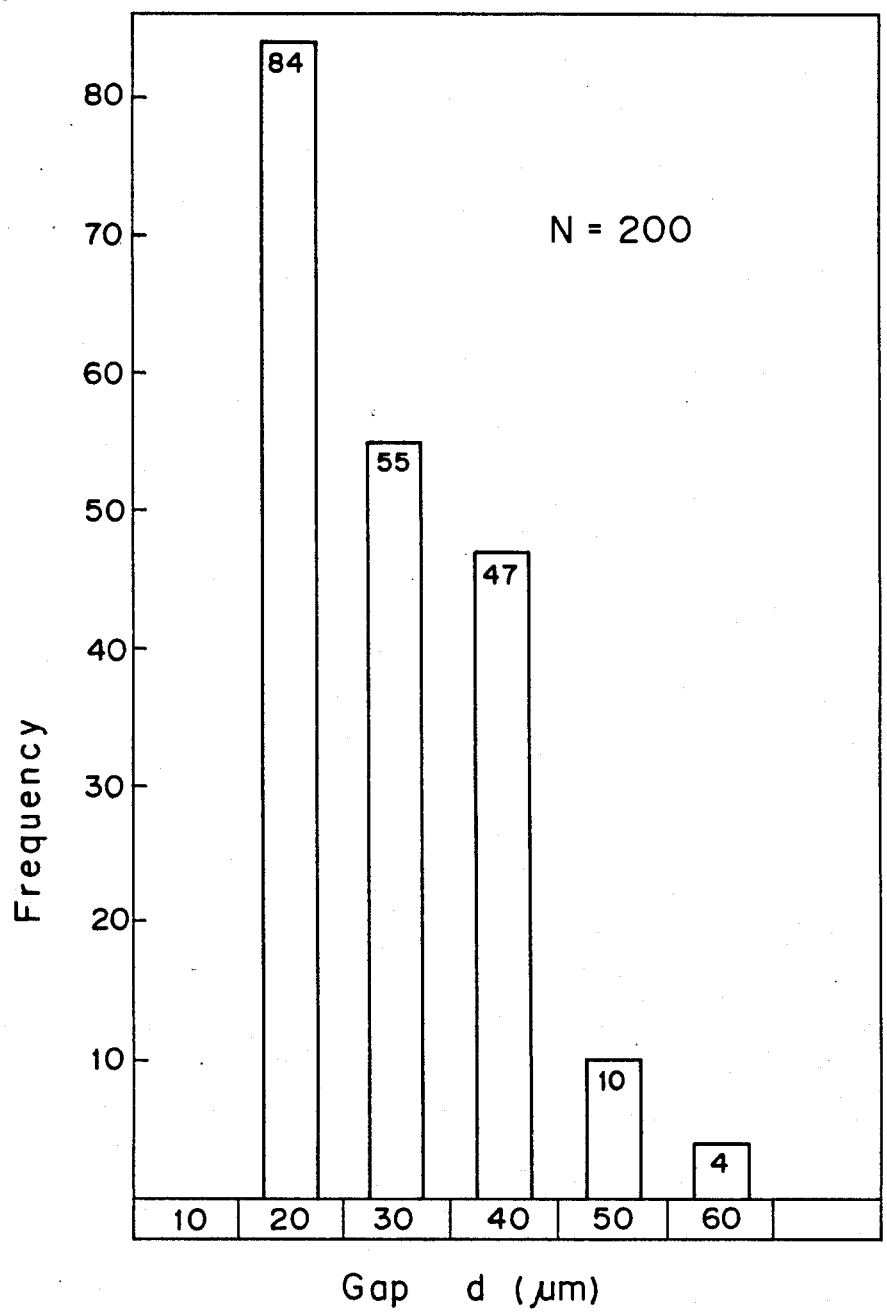
FIG. 16(A) is a graph indicative of other cutting characteristics of the apparatus of the present invention.

Meanwhile, when a minimum one of gaps d1 to d5 between the five remaining exposed fiber ends 3' of one multicore coated optical fiber 2 and those of the other multicore coated optical fiber 2, for example, the gap d1, is set at 20 μm as shown in FIG. 16(B), the abscissa of FIG. 16(A) represents the remaining ones of the gaps d1 to d5, i.e,. the gaps d2 to d5 measured for each of 50 multicore coated optical fibers 2. Thus, the number of data in FIG. 16(A) is 200 (=4×50). FIG. 16(A) reveals that the gap d reaches 60 μm at its maximum. Thus, by setting an overlap amount at 20 μm from past experience, an amount of thrust of the opposite multicore coated optical fibers 2 to each other at the time of the fusion bonding step is preferably set at 80 μm by adding the overlap amount of 20 μm to the maximum gap of 60 μm. The overlap amount of 20 μm is employed because an overlap amount of less than 20 μm and an overlap amount of not less than about 40 μm lead to a smaller diameter and a larger diameter of the coupled remaining exposed fiber ends 3', thereby resulting in increase of the coupling loss.

Figure 17:
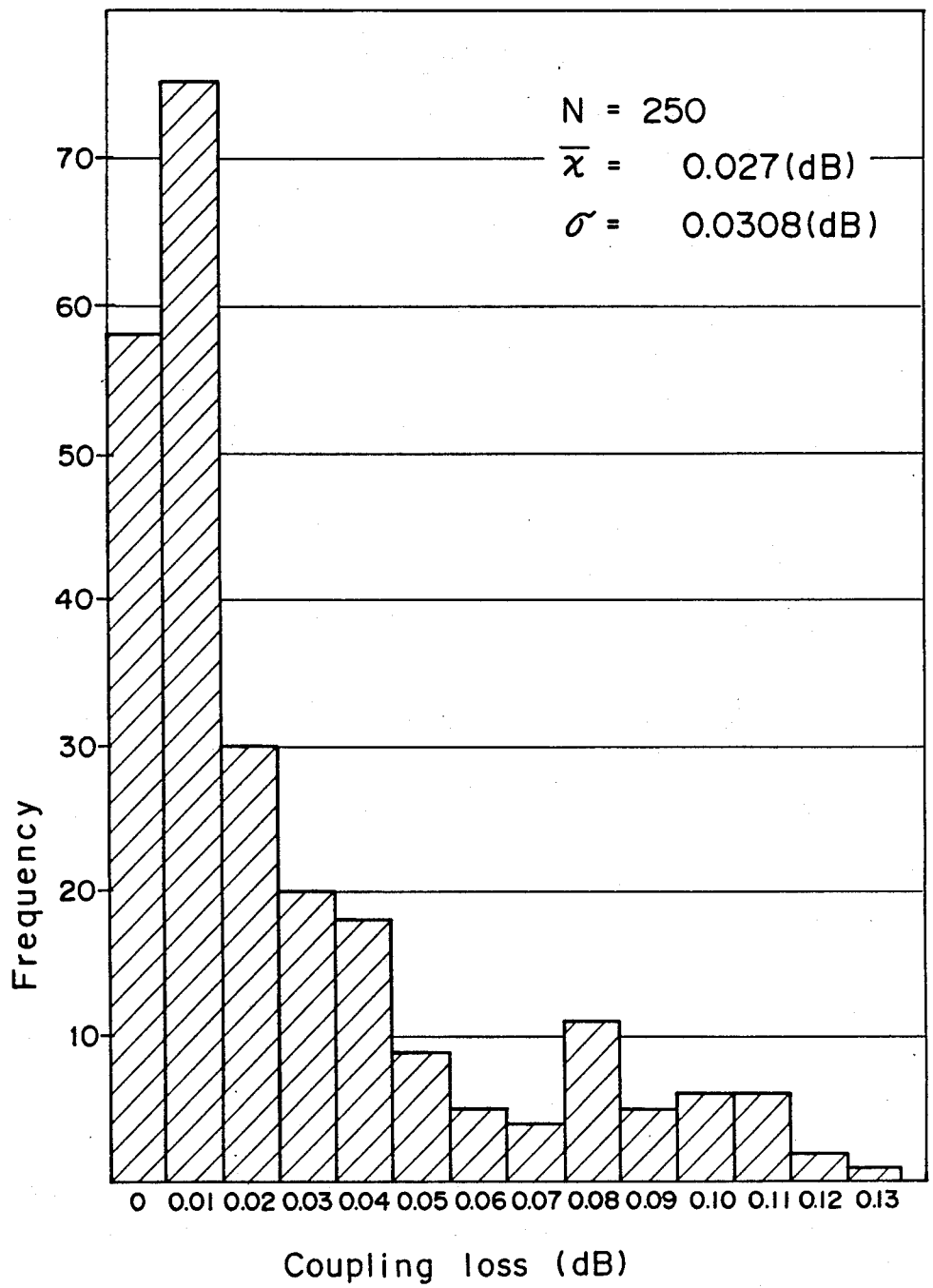
FIG. 17 is a graph indicative of coupling loss of the apparatus of the present invention.

Furthermore, FIG. 17 shows a histogram of the coupling loss of the apparatus of the present invention, in which five coupled remaining exposed fiber ends 3' of each of 50 multicore coated optical fibers 2 are measured. Thus, the number of data in FIG. 17 is 250 (=5×50). FIG. 17 indicates that the coupling loss is desirably restricted to about 0.03 dB on its average and 0.13 dB even at its maximum.

Figure 18:
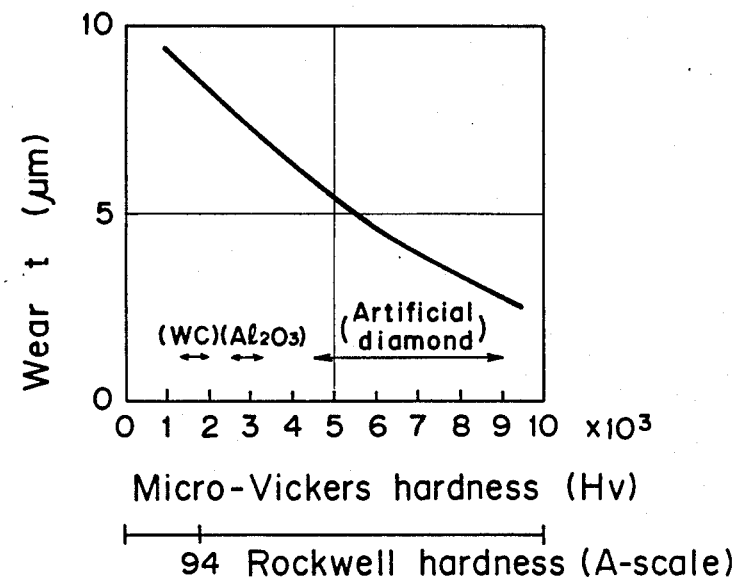
FIG. 18 is a graph indicative of properties of a blade employed in the cutting mechanism of the present invention.
Figure 19:
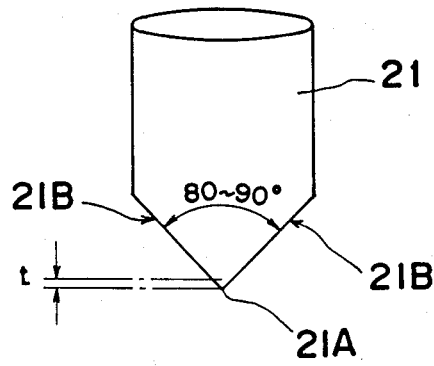
FIGS. 19(A) and 19(B) are a front elevational view and a side elevational view of the blade of FIG. 18, respectively.
Figure 19:
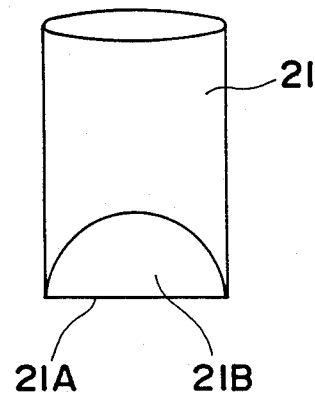

Moreover, experimental relation between wear t of a cutting edge 21A of the blade 21 after 1,000 cutting operations of the blade 21 and hardness of the blade 21 when the blade 21 is made of various materials having different hardnesses is shown in FIGS. 18 and 19. As shown in FIGS. 19(A) and 19(B), the blade 21 of cylindrical shape has two straight wedgy faces 21B forming an angle of 80° to 90° to each other such that the cutting edge 21A is defined by the wedgy faces 21B. FIG. 18 reveals that the wear t is inversely proportional to micro-Vickers hardness Hv and the blade 21 has higher wear resistance and more excellent cutting property as the hardness of the blade 21 is raised. For example, the blade 21 is made of materials having a Rockwell hardness of not less than 90 in its A-scale such as a tungsten carbide series sintered hard alloy, an alumina series ceramic, natural diamond and an artificial diamond produced from powder of boron nitride.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of coupling a first end of a first multi-core coated optical fiber and a second end of a second multi-core coated optical fiber, with the first and second multi-core coated optical fibers each having multiple optical fibers integrally covered with a reinforcement coating, said method comprising:

clamping the coated portions of the first and second multi-core coated optical fibers in first and second clamp members, respectively, said clamp members being movable with said fibers to keep said first and second fibers aligned;

removing the reinforcement coating from the first end of the first multi-core coated optical fiber;

removing the reinforcement coating from the second end of the second multi-core coated optical fiber;

cutting off the first and second exposed fiber ends such that the optical fibers of the first multi-core coated optical fiber and the optical fibers of the second multi-core coated optical fiber have first cut end faces at the first exposed fiber ends and second cut end faces at the second exposed fiber ends, respectively; and coupling the first and second cut end faces;

the cutting step and the coupling step being performed without detaching the first and second multi-core coated optical fibers from the first and second clamp members, respectively 2. A method as claimed in claim 1, wherein the coupling step is performed by a fusion bonding method employing, as a heat source, high-frequency heating through aerial discharge.

3. An apparatus for coupling a first end of a first multi-core coated optical fiber and a second end of a second multi-core coated optical fiber, with the first and second multi-core coated optical fibers each having multiple optical fibers integrally covered with a reinforcement coating, said apparatus comprising:

first and second clamp members for clamping a coated portion of the first and second multi-core coated optical fibers, respectively, each of said first and second clamping members being movable with said fibers to keep the first and second fibers aligned;

the first exposed fiber ends being obtained by removing the reinforcement coating from the first end of the first multi-core coated optical fiber;

the second exposed fiber ends being obtained by removing the reinforcement coating from the second end of the second multi-core coated optical fiber;

a cutting mechanism for cutting off the first and second exposed fiber ends while said first and second optical fibers are still clamped in said first and second clamping members, respectively such that the optical fibers of the first multi-core coated optical fiber and the optical fibers of the second multi-core fiber have first cut end faces at the first exposed fiber ends and second cut end faces at the second exposed fiber ends, respectively; and a coupling mechanism for coupling the first and second cut end faces while said first and second optical fibers remain clamped in said first and second clamping members, whereby non-uniformity in the relative axial position of the coupled fibers is eliminated.

4. An apparatus as claimed in claim 3, wherein said first and second clamp members are movably provided so as to be moved in an axial direction of the first and second multicore coated optical fibers and said cutting mechanism and said coupling mechanism are movably provided.

5. An apparatus as claimed in claim 3, wherein said coupling mechanism is of a fusion bonding type employing, as a heat source, high-frequency heating through aerial discharge.

6. An apparatus as claimed in claim 4, wherein said coupling mechanism is of a fusion bonding type employing, as a heat source, high-frequency heating through aerial discharge.

7. An apparatus as claimed in claim 3, wherein the first exposed fiber ends are disposed at an axially inner portion of the first end such that an axially outer portion of the first end has the reinforcement coating, while the second exposed fiber ends are disposed at an axially inner portion of the second end such that an axially outer portion of the second end has the reinforcement coating, said cutting mechanism comprising:

a first clamp for clamping the axially outer portion of the first end;

a second clamp for clamping the axially outer portion of the second end;

a blade for inflicting initial flaws on the first and second exposed fiber ends, respectively;

a stem whose distal end has a curvature; and first and second cams for actuating said blade for the first and second exposed fiber ends, respectively, whereby when said stem has been brought into contact with each of the first and second exposed fiber ends so as to support each of the first and second exposed fiber ends against scratching motion of said blade, the initial flaws are, respectively, inflicted on the first and second exposed fiber ends by said blade and then, said stem is thrusted into each of the first and second exposed fiber ends so as to cut off each of the first and second exposed fiber ends.

8. An apparatus as claimed in claim 4, wherein the first exposed fiber ends are disposed at an axially inner portion of the first end such that an axially outer portion of the first end has the reinforcement coating, while the second exposed fiber ends are disposed at an axially inner portion of the second end such that an axially outer portion of the second end has the reinforcement coating, said cutting mechanism comprising:

a first clamp for clamping the axially outer portion of the first end;

a second clamp for clamping the axially outer portion of the second end;

a blade for inflicting initial flaws on the first and second exposed fiber ends, respectively;

a stem whose distal end has a curvature; and first and second cams for actuating said blade for the first and second exposed fiber ends, respectively, whereby when said stem has been brought into contact with each of the first and second exposed fiber ends, the initial flaws are, respectively, inflicted on the first and second exposed fiber ends by said blade and then, said stem is thrusted into each of the first and second exposed fiber ends so as to cut off each of the first and second exposed fiber ends.

9. An apparatus as claimed in claim 7, wherein said blade is made of material having a Rockwell hardness of not less than 90 in its A-scale, the material being one of a tungsten carbide series sintered hard alloy, an alumina series ceramic, natural diamond and an artificial diamond.

10. An apparatus as claimed in claim 8, wherein said blade is made of material having a Rockwell hardness of not less than 90 in its A-scale, the material being one of a tungsten carbide series sintered hard alloy, an alumina series ceramic, natural diamond and an artificial diamond.

11. An apparatus as claimed in claim 5, further comprising:

a guide for guiding the optical fibers of the first and second multicore coated optical fibers after the first and second exposed fiber ends have been cut off by said cutting mechanism, which is formed with first V-shaped grooves and first comb-shaped recesses for receiving the optical fibers of the first multicore coated optical fiber and with second V-shaped grooves and second comb-shaped recesses for receiving the optical fibers of the second multicore coated optical fiber;

said first and second V-shaped grooves and said first and second comb-shaped recesses being formed in conformity with a predetermined pitch of the optical fibers of the first and second multicore coated optical fibers.

12. An apparatus as claimed in claim 6, further comprising:
a guide for guiding the optical fibers of the first and second multicore coated optical fibers after the first and second exposed fiber ends have been cut off by said cutting mechanism, which is formed with first V-shaped grooves and first comb-shaped recesses for receiving the optical fibers of the first multicore coated optical fiber and with second V-shaped grooves and second comb-shaped recesses for receiving the optical fibers of the second multicore coated optical fiber;
said first and second V-shaped grooves and said first and second comb-shaped recesses being formed in conformity with a predetermined pitch of the optical fibers of the first and second multicore coated optical fibers.

* * * * *